UNITED STATES PATENT OFFICE.

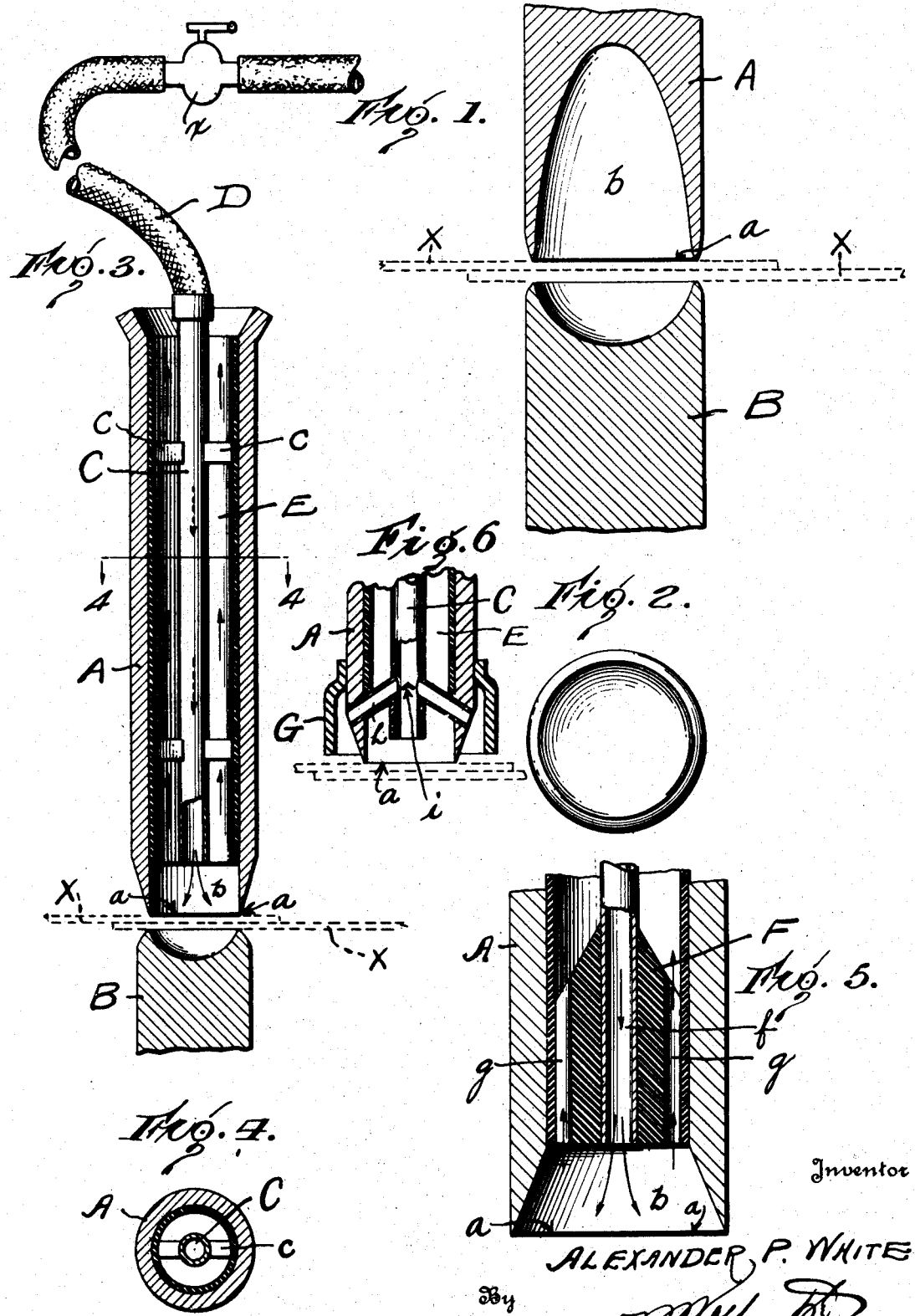

ALEXANDER P. WHITE, OF CALDWELL, NEW JERSEY, ASSIGNOR TO GENERAL FIRE-PROOFING COMPANY, OF YOUNGSTOWN, OHIO, A CORPORATION OF OHIO.

ELECTRIC WELDING.

1,281,454.     Specification of Letters Patent.     Patented Oct. 15, 1918.

Application filed March 15, 1917. Serial No. 155,076.

*To all whom it may concern:*

Be it known that ALEXANDER P. WHITE, a citizen of the United States, residing at Caldwell, in the county of Essex and State of New Jersey, have invented certain new and useful Improvements in Electric Welding, of which the following is a specification.

The present invention relates to a novel method and means of fastening component parts together by the process of electric welding and also to the new article produced thereby.

The object of my invention is to provide an improved way of uniting metallic sheets in welding engagement, and it consists of a new process of electric welding by which certain difficulties which I believe are incident to all present welding processes are overcome or avoided. It is well known that, according to the processes, prior to my invention, it has been impossible to unite two thin sheets of metal by electric welding, in a practical commercial manner, except at comparatively small spots. That is to say the area of the surfaces involved in the welds, is comparatively small, the said areas partaking of the nature of small spots and producing a union which may be likened to riveting. Attempts to enlarge the spots to involve more extended areas, so that the union should be greatly different from rivet fastenings, in respect to the amount of the surface of the sheets embraced in the union, have not been commercially successful, for the reason that when the electric current is applied to the larger areas, some portions of the areas would be overheated and the metal destroyed by burning, before other portions would be reduced to the plastic state necessary to produce the weld. In United States Patent No. 1,046,066, of December 3, 1912, Johann Harmatta discloses a process, by which the destruction or serious impairment of the metal is avoided, but Harmatta achieves this result by limiting, to a very small area, the effective union of the sheets. In short he directs the melting current to a point involving so little metal in the radius of electric influence, that there is practically no opportunity for one portion of area to be destroyed while another is advancing to the plastic state. In contradistinction to the method of drawing the electric current to a point, producing a welded spot of area so small that there cannot, in the nature of things, be room for varying conditions, my method is to distribute the electric heat in such a manner that there cannot be in the application, the opportunity for the varying conditions which are avoided by Harmatta's spots of limited area. I achieve my result by delivering the electric current in a circle, so that instead of producing a spot, I produce an annular weld capable of embracing substantially large areas. It will be noted that a circle is the same at all points of the circumference and that there is no reason for the variations which occur in a solid field area of fusion.

Moreover, this method permits of the control of conditions, to the end that the metal can be protected by artificial radiation, or acceleration of radiation, by passing an air current over the surface portions, liable to be affected by excessive temperatures, or unequal temperatures, due to variations in the resistance of the metal, to the passage of the electric current. Such variations may result from variations in the molecular structure of the metal in different portions, and to different physical conditions, such as unequal contact, due to undulations or any other irregularities in the surface of the sheets. As will be seen from inspection of the drawings, the air is passed through an electrode of tubular form until it impinges on the surface within the circle. Flowing over this surface it escapes through the discharge passages shown in the illustration in the outer walls of the electrode. That is to say the electrode is constructed in the form of a double tube. Through one of the tubular passages, preferably the central passage the air is introduced. It is compressed to facilitate movement. A recess or chamber is provided in the operative end of the electrode in which the air strikes or passes over the metal surface which would be overheated under other or ordinary conditions. After striking this surface the air is turned back to pass away through the vent passage shown in the illustration, between the entrance passage in the center and the outer walls of the electrode.

As indicated various forms of devices or instrumentalities may be employed in carrying out my new method of welding, but for purposes of illustration certain practical forms of construction that may be available for this purpose are illustrated in the accompanying drawings. In these drawings—

Figure 1 is a sectional view showing a pair of clamping electrodes arranged in operative relation to each other and to metal sheets to be welded together, said electrodes embodying, in a primary form, the improvement contemplated by the present invention.

Fig. 2 is an end view of the primary form of electrodes shown in Fig. 1.

Fig. 3 is a sectional view of another form of apparatus that may be employed in carrying out my invention.

Fig. 4 is a cross-sectional view on the line 4—4 of Fig. 3.

Fig. 5 is a sectional view of another modified form of electrode that may be utilized and which embodies the present invention.

Fig. 6 is a sectional view of another modification of the electrode showing a skirt or hood at the outer side thereof.

Like references designate corresponding parts throughout the several figures of the drawings.

In carrying out my process, the metal is brought to the welding condition as usual by the heat due to the resistance which the metal offers to the passage of the electric current from one electrode to the other, but this is well known in the art, and need not be further described here. It is also a matter of familiar knowledge that as the metal is brought to the welding stage, pressure is applied to the parts to effect the union. The pressure is applied only long enough to insure cohesion and the volume of the current is varied according to the thickness of the sheets and the amount of metal involved.

Although I have shown definite means for carrying out the process herein described, I desire to note that the invention is a conception distinct and apart from any specific instrumentality, and that different instrumentalities may be employed to carry out the process, depending on the manner in which the instrumentalities are directed to operate. Means are simply required to direct the electric current in the manner shown, and to press together the parts to be welded at the time the metal is brought to the welding state.

Referring to the illustrated form of apparatus which may be utilized in carrying out the present invention, there is shown in Fig. 1 of the drawings, a primary form of apparatus. This apparatus involves any of the usual and well known devices of electric welding machines (not shown) which are associated with the clamping electrodes to provide for clamping the latter with any required pressure upon the parts to be welded together, and according to the present invention these clamping electrodes are of a novel and peculiar form to provide for applying the heating currents to the metal parts to be welded in lines having substantially the characteristics of a circle. That is to say, the present invention provides an electrode designated in Fig. 1 by the reference letter A having a circular contact edge $a$, through which the current is carried and distributed to the metal to produce welds characterized by a ring-like formation. In this primary form of the apparatus, the clamping electrode A, which of course coöperates with an opposite complemental clamping electrode B, is recessed or hollowed to a sufficient extent and depth, as at $b$, in its lower end portion to clearly define and segregate the circular contact edge from the body part of the electrode to compel the heating currents to be distributed onto the plates, as already described.

Another, and desirable form of the apparatus, that may be employed is shown in Figs. 3 and 4 of the drawings. In this form of apparatus the electrode is preferably of a hollow or tubular form, having its lower edge formed with the circular contact edge $a$, previously referred to, and has associated therewith a means for supplying air under pressure to the heated metal parts subjected to the welding operation. In this embodiment of the invention, the air may be effectually delivered by means of an interior air conduit or pipe C, preferably supported centrally within the hollow or tubular conduit A, and held in position therein by spacing supporting elements $c$, or by equivalent means. This air conduit may be conveniently connected with a source of compressed air supply through a hose or piping B connected with its upper end (and associated with a suitably controlled cock $x$), and by reason of the centering of the air conduit C within the hollow electrode, there is provided in the electrode, about said conduit an air exhausting passageway E extending throughout the length of the hollow electrode. This construction and arrangement of parts may of course be modified or changed structurally and the air released from ports at the sides of the hollow electrode or otherwise without affecting the invention, but in the particular embodiment suggested in Fig. 3, it will be observed that the compressed air delivered from the lower end of the conduit C onto the metal sheets inside of the circle of weld, is returned upwardly through the said exhaust passage E and discharged into the open air at any suitable point.

Another form of construction that may be utilized is suggested in Fig. 5 of the drawings and involves the feature of inserting an insulating block or plug F within the bottom portion of the hollow electrode and piercing said plug with an air supply opening *f* for distributing the air onto the heated surfaces, and with exhaust ports *g* for exhausting the air. Also, as suggested in Fig. 6 of the drawings, there may be applied to the outer side of the lower end portion of the hollow electrode an outer depending skirt or hood G which terminates slightly above the contact edge *a* and which is in communication with the source of air supply through nipples *h* which are connected in any suitable manner with the interior air conduit C. In this modification as shown in Fig. 6, it is desirable to insert a suitable deflector *i* within the lower end portion of the conduit C to provide means for directing air currents into the said nipples as well as through the lower end of the conduit which delivers the air to the area inside of the circular well.

Although I have shown the delivery of the electric current in a circle capable of producing a weld characterized by annular form, still it is obvious that the feature underlying the invention is the peculiar distribution of the electric current, because the circular form provides, first, a method designed to obtain uniform conditions in the parts affected by the heat; and second, because this form provides a convenient and desirable way of applying the compressed air. It follows obviously, however, after the disclosure of the circle, that modifications can readily be made, without departing from the spirit of my invention, such, for instance as the division of the circle into arc, and the claims, as drawn, are intended to include variations. I also desire to note that I am aware that when air is compressed, its avidity to absorb heat is increased and that the greater the compression the greater will be its efficiency in this respect, although the degree of compression is to be suited to requirements, and it can be greatly varied. As the air will expand when it comes in contact with the heated surfaces, the vent port or ports should be considerably larger than the port or ports through which the air enters. The electrode may be of solid copper provided with the ports cut or bored into the solid metal. With the electrode in a solid piece, suitable provision for the conductivity of the electric current may be more readily made, but this is a matter that will be understood by those familiar with the art without further explanation. In the drawings, the air passages are shown formed with an insulating material but the use of insulating substances is not intended to be shown as an essential. The size of the ports may also be varied, the proportions shown in the drawings being exaggerated and intended as illustrative of only one way by which they can be formed.

It will be understood from the foregoing that the apparatus employed for carrying out the invention may be in different forms, but in every embodiment of the invention it will be observed that the distinctive feature thereof resides in applying the heating currents in a circular path, as distinguished from causing currents to be directed to mere spots or points on the surfaces to be welded.

I claim:

1. An improvement in the art of electric welding consisting in pressing together the sheets to be welded, applying the electric heating current thereto in an uninterrupted circular path, and simultaneously with the heating operation causing a blast of atmospheric air under pressure to be directed entirely about the weld and the parts adjacent thereto.

2. An apparatus for electric welding including a clamping electrode provided with a circular contact edge, a chamber within its lower part adjacent said edge, and an air conduit discharging into said chamber.

3. An apparatus for electric welding including a clamping electrode provided with a contact edge, and air conduits arranged to discharge blasts of air around said edge at both the inside and outside thereof.

In testimony whereof I hereunto affix my signature in the presence of two witnesses.

ALEXANDER P. WHITE.

Witnesses:
   D. P. WOLHAUPTER,
   EMORY L. GROFF.